(12) United States Patent
Lee et al.

(10) Patent No.: US 8,041,134 B2
(45) Date of Patent: Oct. 18, 2011

(54) APPARATUS TO PROVIDE BLOCK-BASED MOTION COMPENSATION AND METHOD THEREOF

(75) Inventors: Sung-hee Lee, Suwon-si (KR); Bong-soo Hur, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1269 days.

(21) Appl. No.: 10/823,674

(22) Filed: Apr. 14, 2004

(65) Prior Publication Data

US 2004/0252896 A1    Dec. 16, 2004

(30) Foreign Application Priority Data

Jun. 16, 2003  (KR) .................. 10-2003-0038797

(51) Int. Cl.
*G06K 9/36* (2006.01)
(52) U.S. Cl. ....................................... 382/236; 382/300
(58) Field of Classification Search .................... None
See application file for complete search history.

(56) References Cited

U.S. PATENT DOCUMENTS 6,430,316 B1    8/2002  Wilkinson

FOREIGN PATENT DOCUMENTS

| JP | 2000-299864 | 10/2000 |
|---|---|---|
| KR | 1996-28436 | 7/1996 |
| KR | 1001442950000 | 4/1998 |
| KR | 1020010045433 | 6/2001 |
| WO | WO 99/38316 | 7/1999 |

OTHER PUBLICATIONS

J.-R. Ohm: "Motion Grid Interpolation with Simple Contour Adaptation" Proceedings of International Picture Coding Symposium PCS'96, Mar. 13, 1996, pp. 285-290, XP002290774 Melbourne, Australia.*

Chinese Office Action issued on Dec. 9, 2005 in Chinese Appln 200410044769X.

(Continued)

*Primary Examiner* — Daniel Mariam
*Assistant Examiner* — Elisa Rice
(74) *Attorney, Agent, or Firm* — Stanzione & Kim, LLP (57) ABSTRACT

A motion compensation apparatus to provide block-based motion compensation, and a method thereof. A first motion compensation interpolator calculates a first interpolation pixel by reading a first and a second pixel corresponding to a motion vector of an estimated current block respectively from a current and a previous frame or field. A second motion compensation interpolator calculates a second interpolation pixel by reading a third and a fourth pixel corresponding to a motion vector of peripheral blocks adjacent to the current block respectively from the inputted current and previous frame or field. A candidate interpolation pixel calculator calculates a candidate interpolation pixel by allocating a predetermined weight to the first and the second interpolation pixels, among the current blocks. A motion analyzer analyzes the motion vectors of the current block and the peripheral blocks, and determines discontinuities between the blocks. A final interpolation pixel selector selects either of the first interpolation pixel and the candidate interpolation pixel as a final interpolation pixel, according to the discontinuities determined at the motion analyzer. Accordingly, by applying an overlap block motion compensation according to discontinuities between the current and the peripheral blocks, an image can be provided in which the block artifacts are removed or reduced.

19 Claims, 5 Drawing Sheets

OTHER PUBLICATIONS

G. Heising et al.; "Wavelet-based very low bit-rate video coding using image warping and overlapped block motion compensation"; IEEE Proceedings: Vision, Image and Signal Processing, vol. 148, No. 2, Apr. 2001; pp. 93-101.

Byung-Tae Choi et al.; "New Frame Rate Up-Conversion Using Bi-Directional Motion Estimation"; IEEE Transactions on Consumer Electronics, vol. 46, No. 3, pp. 603-609.

* cited by examiner

APPARATUS TO PROVIDE BLOCK-BASED MOTION COMPENSATION AND METHOD THEREOF

CROSS-REFERENCE TO RELATED APPLICATIONS

This application claims the benefit of Korean Application No. 2003-38797, filed Jun. 16, 2003, in the Korean Intellectual Property Office, the disclosure of which is incorporated herein by reference.

BACKGROUND OF THE INVENTION

1. Field of the Invention

The present invention relates to a motion compensation apparatus and the method thereof, and more particularly, to a block-based motion compensation apparatus capable of outputting an artifact-free image signal by discriminately applying an overlap block motion compensation (OBMC) technique only to blocks having block artifacts, and a method thereof.

2. Description of the Related Art

A compression technique enables reduction of data in size, while maintaining the contents of the data. One of typical methods of providing a moving picture compression is a moving picture experts group (MPEG) method.

The MPEG has been suggested in an effort to improve a data compression rate by removing temporal and spatial redundancy between each frame or field. The temporal redundancy is removed by a motion estimation which finds the most similar block between a previous frame or field and a current frame or field. The spatial redundancy is removed by a discrete cosine transform (DCT).

The motion estimation is generally carried out by a block matching algorithm (BMA). BMA estimates one motion vector per block by comparing two consecutive frames, namely, the previous frame or field and the current frame or field based on the assumption that pixels in the compared blocks move in a manner of translation.

The motion vector estimated at a transmitter is transmitted to a receiver together with a motion prediction error, such as Sum of Absolute Difference (SAD), which occurs between the current frame or field and the previous frame or field. Then, motion compensation is performed in the receiver using the current and/or the previous frame or field with the received motion vector, and the frame or field is adaptively restored according to the received motion prediction error.

However, when the compressed data is restored by the conventional method of motion compensation, block artifacts may occur in the restored image. The occurrence of block artifacts is a phenomenon that boarders between adjacent blocks that look discontinuous in the restored frame or field, resulting in a visually inferior image and deterioration of image quality. The block artifacts usually occur in the process of block-based motion estimation and the motion compensation.

Meanwhile, the conventional motion compensation method uses an overlap block motion compensation (OBMC) on the basis of entire blocks to prevent the block artifacts. However, the OBMC has another problem of causing a blurring throughout the image.

SUMMARY OF THE INVENTION

Accordingly, in an effort to overcome the above and/or other problems, it is an aspect of the present invention to provide a block-based motion compensation apparatus capable of performing accurate motion compensation by discriminately applying OBMC only to blocks having block artifacts, and a method thereof.

Additional aspects and advantages of the invention will be set forth in part in the description which follows and, in part, will be obvious from the description, or may be learned by practice of the invention.

The foregoing and/or other aspects of the present invention are achieved by providing a block-based motion compensation apparatus including a first motion compensation interpolator to calculate a first interpolation pixel by reading a first and a second pixel corresponding to a motion vector of an estimated current block, respectively, from a current and a previous frame or field inputted, at least one second motion compensation interpolator to calculate a second interpolation pixel by reading a third and a fourth pixel corresponding to a motion vector estimated with respect to at least one peripheral block adjacent to the current block to be interpolated, respectively, from the inputted current and previous frame or field, a candidate interpolation pixel calculator to calculate a candidate interpolation pixel by allocating a predetermined weight to the first and the second interpolation pixels according to relative locations where the first and the second interpolation pixels are interpolated, among the current blocks to be interpolated, a motion analyzer to analyze the estimated motion vectors of the current block and the peripheral blocks, and to determine discontinuities between the current block and the peripheral blocks, and a final interpolation pixel selector to select among the first interpolation pixel and the candidate interpolation pixel as a final interpolation pixel according to the discontinuities determined at the motion analyzer, and to output the selected final interpolation pixel.

More specifically, the motion analyzer compares a deviation of the current and the peripheral motion vectors with a preset threshold, and then when the deviation is larger than the preset threshold, outputs a signal to the final interpolation pixel selector indicating to select the candidate interpolation pixel calculated from the candidate interpolation pixel calculator as a final interpolation pixel, and when the deviation is smaller than the preset threshold, outputs a signal indicating to select the first interpolation pixel calculated from the first motion compensation interpolator as a final interpolation pixel.

The first and the second motion compensation interpolators respectively include a first pixel reader to read the first pixel corresponding to the motion vector of the current block from the inputted current frame or field, a second pixel reader to read the second pixel corresponding to the motion vector of the current block from the inputted previous frame or field, a first and a second multiplier to multiply a relative location correlation coefficient between the current and the previous frame or field by the read first and second pixels, and to output the result as first and second multiplication data, and a first adder to calculate the first interpolation pixel by adding the first and the second multiplication data outputted from the first and the second multipliers. The sum of the relative location correlation coefficients which are respectively provided to the first and the second pixels is 1.

The relative position correlation coefficient is calculated by a following equation:

$$r = \frac{b}{a+b},$$

where, r is the relative location correlation coefficient multiplied by the second pixel, a is a minimum distance between the frame or field to be interpolated and the previous frame or field, and b is a minimum distance between the frame or field to be interpolated and the current frame or field.

In an aspect of this embodiment, the candidate interpolation pixel calculator includes a weight storage part being allocated with weights with respect to the relative locations of the pixels for interpolation in the current block, a weight storage part to read and provide the weight corresponding to positions where the calculated first and second interpolation pixels are interpolated, among the allocated weights, a third and a fourth multiplier being provided with the weights corresponding to locations for interpolation of the first and the second interpolation pixels from the weight storage part, to multiply the weights by the first and the second interpolation pixels and to output the result as third and fourth multiplication data, and a second adder to calculate the candidate interpolation pixel by adding the third and the fourth multiplication data outputted from the third and the fourth multipliers. The sum of the weights allocated to the first and the second interpolation pixels in the location where the first and second interpolation pixels are interpolated is 1.

From center locations to a boarder location, for interpolation of the first and the second interpolation pixels, the weight allocated to the first interpolation pixel decreases and the weight allocated to the second interpolation pixel increases.

The motion compensation apparatus further includes a delayer to delay the inputted current frame or field for a predetermined time and to provide the delayed frame or field to the first and the second motion compensation interpolators and the motion compensation part.

The second motion compensation interpolator is provided in the same number as the peripheral block.

The foregoing and/or other aspects of the present invention are also achieved by providing a block-based motion compensation method including calculating a first interpolation pixel by reading first and second pixels corresponding to a motion vector of an estimated current block, respectively, from a current and a previous frame or field, calculating a second interpolation pixel by reading third and fourth pixels corresponding to motion vectors estimated with respect to at least one peripheral block adjacent to the current block to be interpolated, respectively, from the inputted current and previous frame or field, calculating a candidate interpolation pixel by allocating a predetermined weight to the first and the second interpolation pixels according to relative locations where the first and the second interpolation pixels are interpolated among the current blocks to be interpolated, analyzing the estimated motion vectors of the current block and the peripheral blocks, determining discontinuities between the current block and the peripheral blocks, and selecting among the first interpolation pixel and the candidate interpolation pixel as a final interpolation pixel according to the discontinuities determined in the determining operation, and then outputting the selected final interpolation pixel.

More specifically, the motion analyzing operation compares a deviation of the current and the peripheral motion vectors with a preset threshold, and then when the deviation is larger than the preset threshold, outputs a signal to the final interpolation pixel selector indicating to select the candidate interpolation pixel calculated from the candidate interpolation pixel calculator as a final interpolation pixel, and when the deviation is smaller than the preset threshold, outputs a signal indicating to select the first interpolation pixel calculated from the first motion compensation interpolator as a final interpolation pixel.

The first and second interpolation pixel calculating operations respectively include reading the first pixel corresponding to the motion vector of the current block from the inputted current frame or field, reading the second pixel corresponding to the motion vector of the current block from the inputted previous frame or field, multiplying a relative location correlation coefficient between the current and the previous frame or field by the read first and second pixels, and outputting the result as first and second multiplication data, and calculating the first interpolation pixel by adding the first and second multiplication data outputted from the first and the second multipliers. The sum of the relative location correlation coefficients which are respectively provided to the first and second pixels is 1.

The candidate interpolation pixel calculating operation includes reading and providing the weight corresponding to positions where the calculated first and second interpolation pixels are interpolated, among the allocated weights, multiplying the weights by the first and second interpolation pixels, and outputting the result as third and fourth multiplication data, and calculating the candidate interpolation pixel by adding the outputted third and fourth multiplication data. The sum of the weights allocated to the first and the second interpolation pixels in the location where the first and second interpolation pixels are interpolated is 1.

In addition, the method further comprises delaying the inputted current frame or field for a predetermined time, and then providing the delayed frame or field to the first and second interpolation pixel calculating operation.

BRIEF DESCRIPTION OF THE DRAWINGS

These and other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 1:
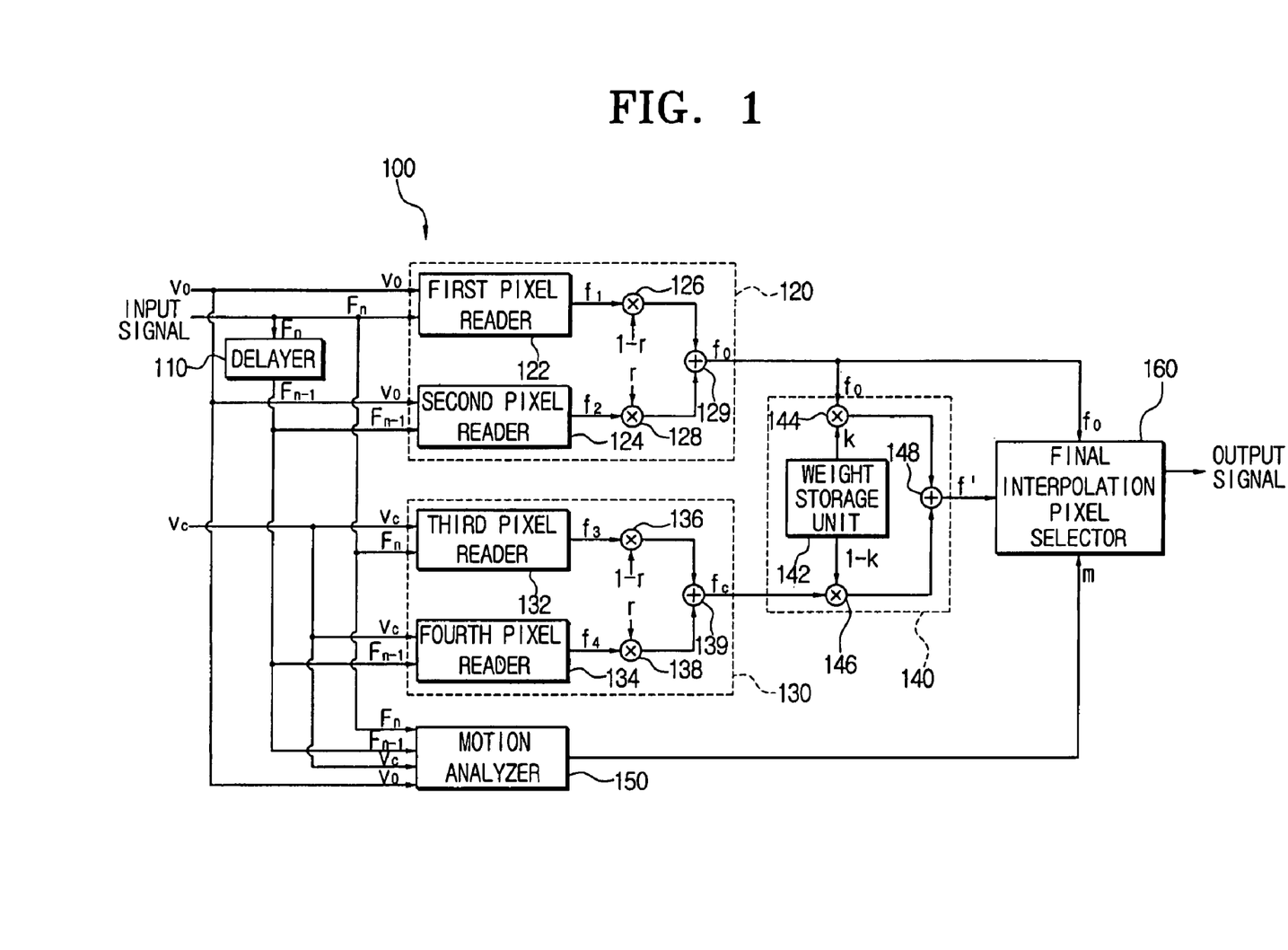
FIG. 1 is a block diagram schematically showing a block-based motion compensation apparatus, according to an embodiment of the present invention.

FIG. 1 is a block diagram schematically showing a block-based motion compensation apparatus, according to an embodiment of the present invention.

Referring to FIG. 1, the block-based motion compensation apparatus 100 includes a delayer 110, a first motion compensation interpolator 120, a second motion compensation interpolator 130, a candidate interpolation pixel calculator 140, a motion analyzer 150 and a final interpolation pixel selector 160.

The motion compensation apparatus 100 performs motion compensation, by use of BMA-estimated motion vectors, of a current block to be interpolated and its peripheral blocks, and a motion error.

Figure 2:
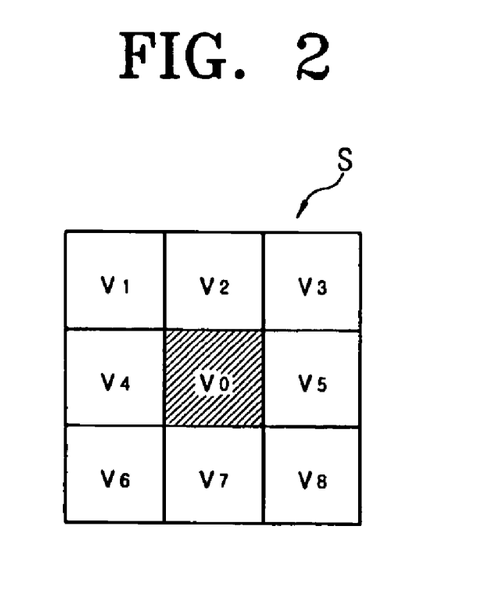
FIG. 2 shows motion vectors estimated with respect to a current block and peripheral blocks, respectively.

The motion compensation apparatus 100 receives an input of a motion vector $v_0$ estimated with respect to the current block and motion vectors $v_1$ to $v_8$ estimated with respect to peripheral blocks surrounding the current block. In addition, the motion compensation apparatus 100 receives a current frame or field $F_n$ as an input signal.

The inputted current frame or field $F_n$ is supplied to first and third pixel readers 122 and 132, respectively, and to a motion analyzer 150, which will be described later.

The delayer 110 delays the inputted current frame or field $F_n$ for a predetermined time, and outputs the delayed frame or field $F_{n-1}$. The frame or field $F_{n-1}$ outputted from the delayer 110 is provided to second and fourth pixel readers 124 and 134, respectively, and the motion analyzer 150, which will be described later.

The first motion compensation interpolator 120 includes the first and second pixel readers 122 and 124, respectively, a first and a second multiplier 126 and 128, respectively, and a first adder 129.

The first motion compensation interpolator 120 reads first and second pixels $f_1$ and $f_2$ corresponding to the estimated motion vector $v_0$ of the current block, respectively, from the current and the previous frame or fields $F_n$ and $F_{n-1}$, and calculates a first interpolation pixel.

In greater detail, the first pixel reader 122 reads the first pixel $f_1$ corresponding to the motion vector $v_0$ of the current block from the current frame or field $F_n$.

The second pixel reader 124 reads the second pixel $f_2$ corresponding to the motion vector $v_0$ of the current block from the previous frame or field $F_{n-1}$.

The first multiplier 126 multiplies a correlation coefficient of a relative location between a frame or field $F_i$ to be interpolated by the current and previous frames or fields $F_n$ and $F_{n-1}$, respectively, by the read first pixel $f_1$, and outputs the result as a first multiplication data. The correlation coefficient relates to a frame rate conversion, and is calculated by Equation 1 below.

$$1 - r = 1 - \frac{b}{a+b} = \frac{a}{a+b} \quad \text{[Equation 1]}$$

Figure 3:
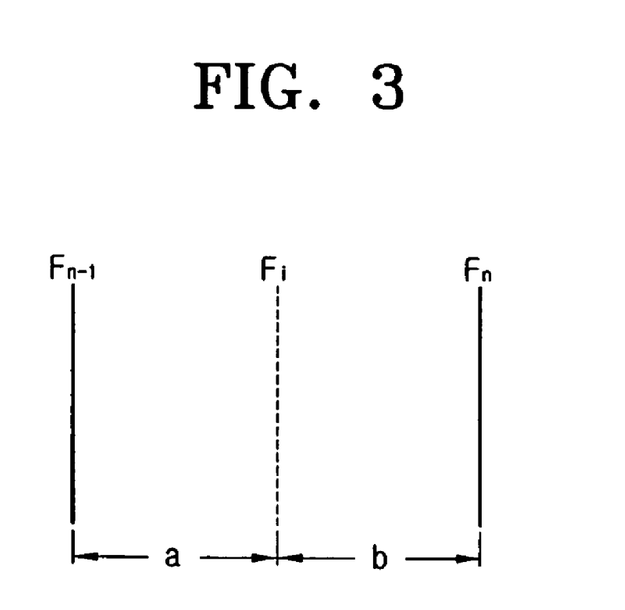
FIG. 3 illustrates a method of calculating a correlation coefficient for a relative location, which is applied for the motion compensation apparatus of FIG. 1.

Referring to FIG. 3 and Equation 1, (1−r) represents the correlation coefficient, a is a minimum distance between the frame or field $F_i$ to be interpolated and the previous frame or field $F_{n-1}$, and b is a minimum distance between the frame or field $F_i$ to be interpolated and the current frame or field $F_n$.

The second multiplier 128 multiplies the correlation coefficient r acquired from Equation 1 by the second pixel $f_2$, and outputs the result as second multiplication data. Accordingly, the sum of the correlation coefficients applied to the first and second pixels $f_1$ and $f_2$ becomes '1'.

The first adder 129 adds the first and second multiplication data from the first and second multipliers 126 and 128, and outputs the result as a first interpolation pixel $f_0$.

The second motion compensation interpolator 130 includes the third and the fourth pixel readers 132 and 134, respectively, third and fourth adders 136 and 138, respectively, and a second adder 139.

The second motion compensation interpolator 130 reads third and fourth pixels $f_3$ and $f_4$, respectively, corresponding to the estimated motion vector $v_c$ estimated with respect to predetermined peripheral blocks among a plurality of the peripheral blocks, respectively, from the current and previous frames or fields $F_n$ and $F_{n-1}$, respectively, and calculates a second interpolation pixel $f_c$.

In particular, the third pixel reader 132 reads the third pixel $f_3$ corresponding to the motion vector $v_c$ of the predetermined peripheral blocks starting from the inputted current frame or field $F_n$. The fourth pixel reader 134 reads the fourth pixel $f_4$ corresponding to the motion vector $v_c$ of the predetermined peripheral blocks starting from the previous frame or field $F_{n-1}$.

The third multiplier 136 multiplies the correlation coefficient 1−r acquired from Equation 1 by the third pixel $f_3$, and outputs the result as the third multiplication data. Further, the fourth multiplier 138 multiplies the correlation coefficient r by the fourth pixel $f_4$ and outputs the result as the fourth multiplication data. The correlation coefficients multiplied by the third and fourth pixels $f_3$ and $f_4$, respectively, are the same as the correlation coefficients applied to the first and second pixels $f_1$ and $f_2$, respectively.

The second adder 139 adds the third and the fourth multiplication data outputted from the third and the fourth multipliers 136 and 138, respectively, and outputs the result as the second interpolation pixel $f_c$.

The first and second interpolation pixels $f_0$ and $f_c$ outputted from the first and the second motion compensation interpolation 120 and 130, respectively, are calculated by Equation 2 and Equation 3 below.

$$f_0 = (1-r) \cdot f\left(x - \frac{v_0}{2}, n\right) + r \cdot f\left(x + \frac{v_0}{2}, n-1\right) = \quad \text{[Equation 2]}$$
$$(1-r) \cdot f_1 + r \cdot f_2$$

$$f_c = (1-r) \cdot f\left(x - \frac{v_c}{2}, n\right) + r \cdot f\left(x + \frac{v_c}{2}, n-1\right) = \quad \text{[Equation 3]}$$
$$(1-r) \cdot f_3 + r \cdot f_4$$

Here, x is a coordinate data of a location in a predetermined block, that is, in either the current block or the peripheral block, n is a temporal location of the current frame or field $F_n$, (n−1) is a temporal location of the previous frame or field $F_{n-1}$, and r ($0 \leq r \leq 1$) is a correlation coefficient applied to the second and fourth pixels. In addition, in Equation 2 and Equation 3, the candidate interpolation pixel calculator 140 includes a weight storage unit 142, fifth and sixth multipliers 144 and 146, respectively, and a third adder 148.

The candidate interpolation pixel calculator 140 can remove or reduce block artifacts by applying an OBMC to blocks having the block artifacts among the blocks to be interpolated.

For this, the candidate interpolation pixel calculator 140 allocates a predetermined weight to the first and second interpolation pixels $f_0$ and $f_c$ among the current blocks to be interpolated according to relative positions where the first and second interpolation pixels $f_0$ and $f_c$ are interpolated, and then calculates a candidate interpolation pixel f'.

Figure 4:
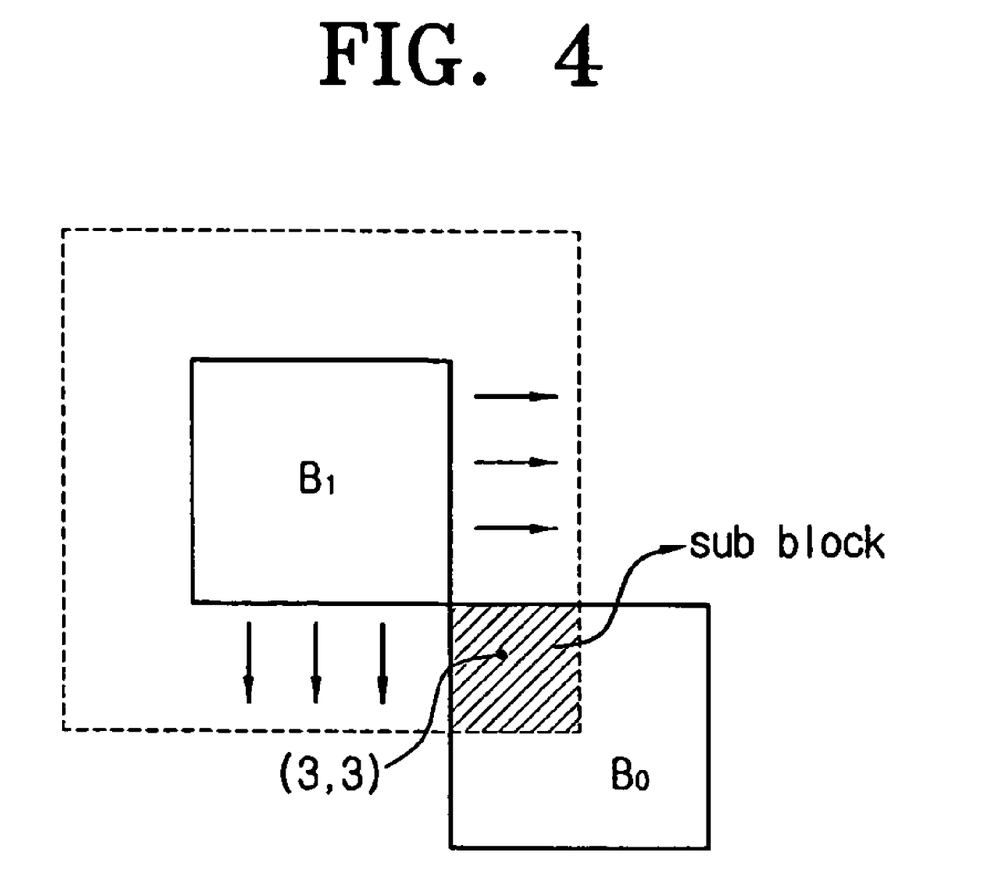
FIG. 4 illustrates an OBMC used to remove block artifacts.

The OBMC is based on the fact that there is a high correlation between the motion vector $v_0$ of the current block and the motion vector $v_c$ of the peripheral blocks. Accordingly, the OBMC partially overlaps the current block $B_0$ with a predetermined peripheral block $B_1$ of a predetermined size by extending it in width/length directions, as shown by arrows in FIG. 4, and performs the motion compensation with respect to an overlapped area, i.e., a sub block which is indicated in FIG. 4 by hatching, as a unit area for motion compensation. That is, the OBMC is to calculate the candidate interpolation pixel f', which will be used for an interpolation by allocating weights to respective areas of current interpolation, based on an assumption that the motion vectors $v_0$ and $v_1$ of the current and the peripheral blocks $B_0$ and $B_1$ influence the motion compensation in the overlapped sub block.

To describe in detail, the weight storage part 142 is allocated with weights for relative location of the pixels in the current block to be interpolated. That is, when there are a plurality of first pixels $f_1$ corresponding to the current motion vector $v_0$ in the current block, a weight k is allocated to be applied to the first interpolation pixel $f_0$, which is calculated whenever the plurality of first pixels $f_1$ are read. The first interpolation pixel $f_0$ is allocated for each location of interpolation. Further, the weight applied to the second interpolation pixel $f_c$ is (1−k).

The weight corresponding to the relative position of the pixels, which are stored in the weight storage part 142, becomes larger as the position becomes closer toward a boarder of the current block $B_0$ from a center of the current block. That is, the weight k for the first interpolation pixel $f_0$ becomes smaller toward the boarder of the current block $B_0$ having the sub block, as the weight k reflects the motion vector $v_0$ of the current block $B_0$. On the other hand, the weight (1−k) for the second interpolation pixel $f_c$ becomes larger toward the boarder of the current block $B_0$ having the sub block as the weight (1−k) reflects the motion vector $v_1$ of the peripheral block $B_1$.

Therefore, when the first and second interpolation pixels $f_0$ and $f_c$ are calculated, the weight storage part 142 reads the weights k and (1−k), respectively, corresponding to the locations where the first and second interpolation pixels $f_0$ and $f_c$ are interpolated. For instance, if the interpolation location of the calculated first and second interpolation pixels is (3, 3) in the current block, the weight storage part 142 reads the predetermined weight k corresponding to the location (3, 3), and provides the weight k to the fifth multiplier 144, and the weight (1−k) to the sixth multiplier 146, respectively. The sum of the weights being provided to the fifth and sixth multipliers 144 and 146 is '1'.

The fifth multiplier 144 outputs a fifth multiplication data by multiplying the first interpolation pixel $f_0$ by the weight k with respect to a location for interpolation of the first interpolation pixel $f_0$. The sixth multiplier 146 outputs sixth multiplication data by multiplying the second interpolation pixel $f_c$ by the weight (1−k) with respect to a location for interpolation of the second interpolation pixel $f_c$.

The third adder 148 calculates the candidate interpolation pixel f' by adding the fifth and sixth multiplication data outputted from the fifth and sixth multipliers 144 and 146, respectively.

Accordingly, the candidate interpolation pixel f' outputted from the candidate interpolation pixel calculator 140 can be obtained by Equation 4 below:

$$f'=k \cdot f_0+(1-k) \cdot f_c \qquad \text{[Equation 4]}$$

where k is the weight applied to the first interpolation pixel $f_0$, and (1−k) is the weight applied to the second interpolation pixel $f_c$, and $0 \leq r \leq 1$.

The motion analyzer 150 analyzes the motion vectors $v_0$ and $v_c$ of the current block and the peripheral blocks, and determines discontinuities between the current and the peripheral blocks. To be more specific, when it is determined that the current block and the peripheral blocks are discontinuous in the motion vector field (not shown), the motion analyzer 150 determines that the block artifacts have occurred and outputs a motion flag m to perform motion compensation in the OBMC mode.

On the other hand, when it is determined that the current and peripheral blocks are continuous in the motion vector field (not shown), the motion analyzer 150 outputs the motion flag m to perform general motion compensation.

The discontinuities between the respective blocks are likely to occur where the motion vector $v_0$ of the current block and the motion vector of the peripheral block, such as $v_1$, are much different from each other. Therefore, to detect the discontinuities, an embodiment as the following can be applied. That is, the motion analyzer 150 compares the deviation of the motion vectors $v_0$ and $v_c$ of the current and the peripheral block, and thereby determines the discontinuities between the current block and peripheral blocks.

In further detail, the motion analyzer 150 calculates the deviation of the motion vector $v_0$ of the current block, and the motion vector $v_1$ of the peripheral block. When the deviation is larger than the preset threshold, the motion analyzer 150 outputs a selection signal m=1 to the final interpolation pixel selector 160. That is, the selection signal m=1 is a motion flag by which the candidate interpolation pixel f' calculated from the candidate interpolation pixel calculator 140 is selected as a final interpolation pixel f.

On the other hand, when the deviation is smaller than the preset threshold, the motion analyzer 150 outputs a selection signal m=0 to the final interpolation pixel selector 160, i.e., outputs a motion flag which selects the first interpolation pixel $f_0$ calculated from the first motion compensation interpolator 120 as a final interpolation pixel f.

The final interpolation pixel selector 160 selects one of the first interpolation pixel f0 and the candidate interpolation pixel f' according to the discontinuities determined in the motion analyzer 150, using a multiplexer according to this embodiment of the present invention.

$$f = \begin{cases} f', & \text{if } m=1 \\ f_0, & \text{otherwise} \end{cases} \qquad \text{[Equation 5]}$$

To explicate referring to Equation 5, when the motion flag m=1 is inputted from the motion analyzer 150, the final interpolation pixel selection 160 selects the candidate interpolation pixel f' calculated by the OBMC as the final interpolation pixel f. Meanwhile, when the motion flag m=0 is inputted from the motion analyzer 150, the final interpolation pixel selector 160 selects the first interpolation pixel calculated from the first motion compensation interpolator 120 as the final interpolation pixel f.

Figure 5:
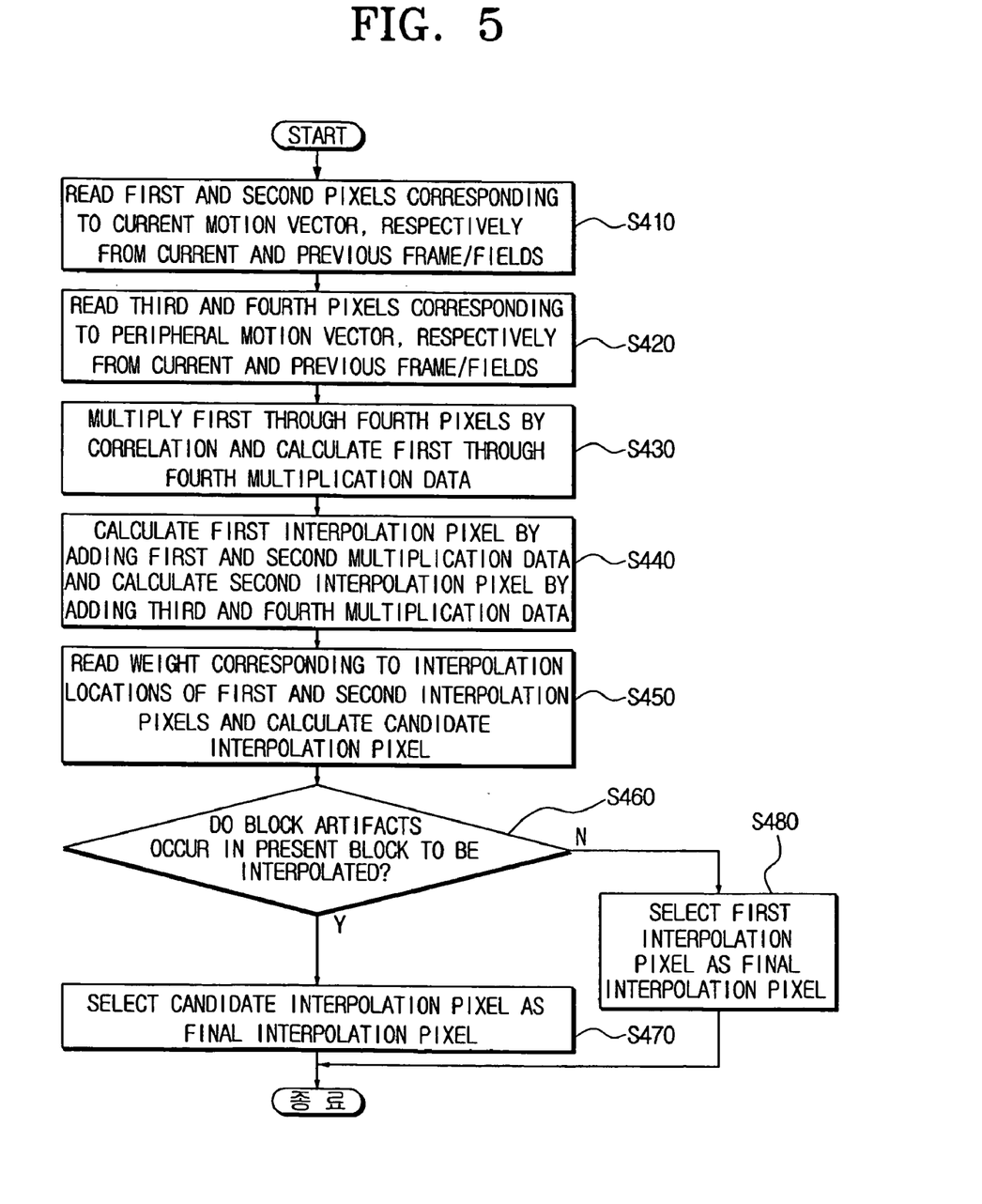
FIG. 5 is a flowchart schematically showing a method of block-based motion compensation of FIG. 1.

FIG. 5 is a flowchart schematically showing a method of block-based motion compensation of FIG. 1.

Referring FIGS. 1 to 5, first, the first and the second pixel readers 122 and 124, respectively read the first and the second pixels $f_1$ and $f_2$ corresponding to the current motion vector $v_0$, respectively from the current and the previous frame or fields $F_n$ and $F_{n-1}$ in operation S410. Then, the third and the fourth pixel readers 132 and 134, respectively read the third and the fourth pixels $f_3$ and $f_4$ corresponding to the peripheral motion vector $v_c$, respectively from the current and the previous frame or fields $F_n$ and $F_{n-1}$ in operation S420.

When the operation S420 is completed, the first through the fourth multipliers 126, 128, 136 and 138 adaptively multiply the predetermined correlation coefficient (1−r) and r, which are calculated by using Equation 1, by the first through the fourth pixels $f_1$ through $f_4$, respectively, and calculate the first through the fourth multiplication data in operation S430.

Next, the first adder 129 calculates the first interpolation pixel $f_0$ by adding the first and the second multiplication data, and the second adder 139 calculates the second interpolation pixel $f_c$ by adding the third and fourth multiplication data in operation S440.

When the operation S440 is completed, the candidate interpolation pixel calculator 140 performs motion compensation by sub block units, using the OBMC. In particular, the candidate interpolation pixel calculator 140 allocates predetermined weights to the first and second interpolation pixels $f_0$ and $f_c$ according to the relative positions where the first and second interpolation pixels $f_0$ and $f_c$ among the current blocks are interpolated, and calculates the candidate interpolation pixel f' in operation S450. At this time, when the first interpolation pixel $f_0$ is allocated with the weight k, the second interpolation pixel $f_c$ is allocated with the weight (1−k).

Also, the motion analyzer 150 analyzes the motion vector $v_0$ of the current block and the motion vector $v_c$ of the peripheral blocks to determine discontinuities between the current block and the peripheral blocks, and outputs the motion flag according to the determined result in operation S460.

For instance, if the deviation between the motion vectors $v_0$ and $v_c$ of the current and the peripheral blocks is larger than the preset threshold, the motion analyzer 150 determines that the block artifacts have occurred due to the discontinuities between the current and peripheral blocks, and outputs motion flag m=1. If the deviation between the motion vectors $v_0$ and $v_1$ of the current and peripheral blocks is smaller than the preset threshold, the motion analyzer 150 determines that there are no discontinuities between the current and the peripheral blocks, and outputs motion flag m=0.

When the motion flag m=1 is inputted from the operation S460, the final interpolation pixel selector 160 selectively outputs the candidate interpolation pixel f' as the final interpolation pixel f, which is calculated from the candidate interpolation pixel calculator 140 (S470).

Meanwhile, when the motion flag m=0 is inputted from the operation S460, the final interpolation pixel selector 160 selectively outputs the first interpolation pixel $f_0$ as the final interpolation pixel f, which is calculated from the first motion compensation interpolator 120 (S480).

The above-described block-based motion compensation apparatus 100, and the method thereof applies the OBMC by considering the correlation between the current block and the plurality of peripheral blocks adjacent to the current block. That is, with the motion compensation apparatus according to the embodiment of FIG. 1, the OBMC is applied with respect to only the blocks where the block artifacts occur, and as a result, a motion-compensated image in which the block artifacts are removed or reduced can be provided.

Figure 6:
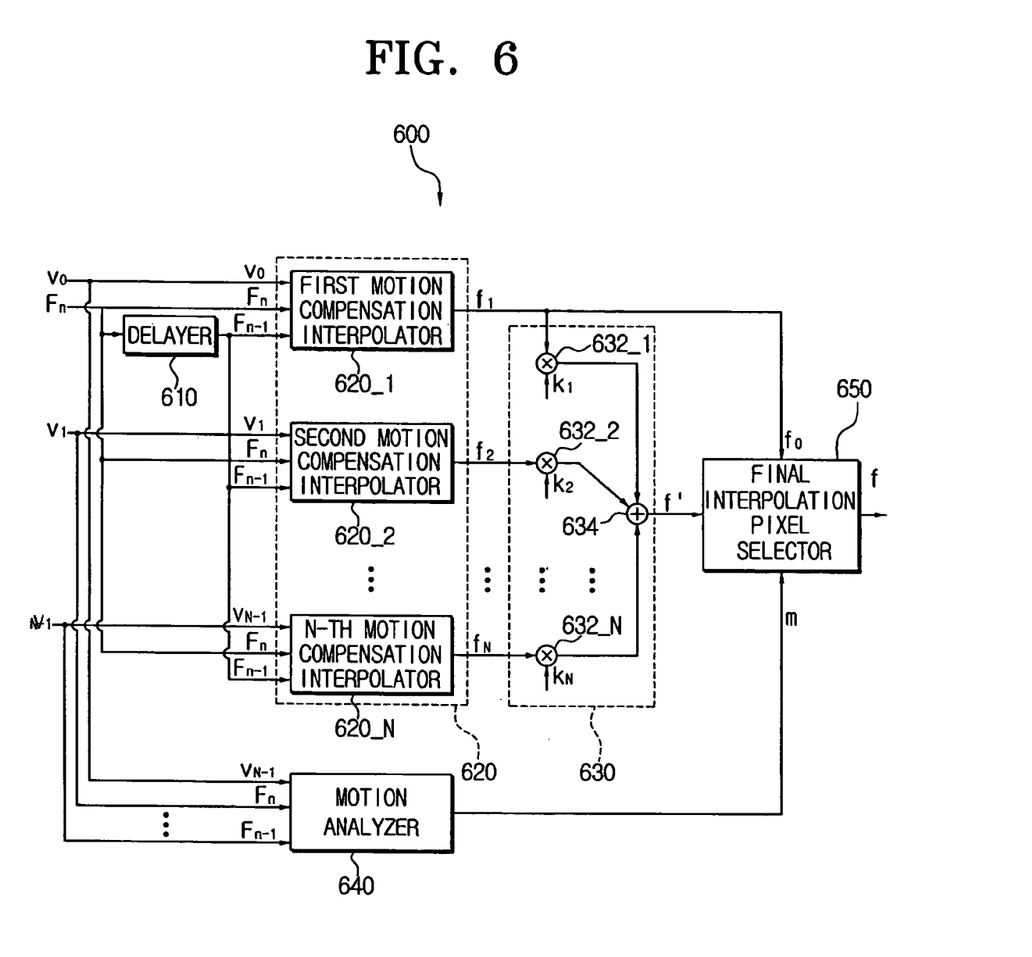
FIG. 6 is a block diagram schematically showing a block-based motion compensation apparatus according to another embodiment of the present invention.

FIG. 6 is a block diagram schematically showing a block-based motion compensation apparatus according to another embodiment of the present invention.

Referring to FIG. 6, the block-based motion compensation apparatus 600 includes a delayer 610, a motion compensation interpolator 620, a candidate interpolation pixel calculator 630, a motion analyzer 640, and a final interpolation pixel selector 650. First of all, the block-based motion compensation apparatus 600 of FIG. 6 applies the OBMC by considering the plurality of peripheral blocks adjacent to the current block.

The delayer 610, the motion compensation interpolator 620, the candidate interpolation pixel calculator 630, the motion analyzer 640, and the final interpolation pixel selector 650 of the block-based motion compensation apparatus 600 of FIG. 6 have similar functions as the delayer 110, the first motion compensation interpolator 120, the second motion compensation interpolator 130, the candidate interpolation pixel calculator 140, a motion analyzer 150, and a final interpolation pixel selector 160 of FIG. 1, and therefore a detailed description with regard to the respective blocks will be omitted for conciseness.

The motion compensation interpolator 620 has first to N-th motion compensation interpolators 620_1 through 620_N, where N refers to the number of the current block and the peripheral blocks considered during the motion compensation.

The first motion compensation interpolator 620_1 calculates the first interpolation pixel $f_1$ by reading a pixel corresponding to the motion vector of the current motion vector. The second through the N-th motion compensation interpolators 620_2 through 620_N respectively calculate the second through the N-th interpolation pixels $f_2$ through $f_n$ by reading pixels corresponding to the motion vector $v_1$ through $v_{N-1}$ of the peripheral motion vectors.

The candidate interpolation pixel calculator 630 comprises a weight storage part (not shown), a first through an N-th multipliers 632_1 through 632_N, and an adder 634.

The candidate interpolation pixel calculator 630 performs motion compensation with respect to blocks where block artifacts occur among blocks to be interpolated, using an overlap block motion compensation (OBMC).

To do this, the respective first through the N-th multipliers 632_1 through 632_N multiply predetermined weights $k_1$ to $k_n$ by the first through the N-th interpolation pixels $f_2$ to $f_n$, according to relative positions where the first through the N-th interpolation pixels $f_2$ to $f_n$ are interpolated among the current blocks to be interpolated. At this time, it is preferable that the sum of the weights $k_1$ to $k_n$, which are supplied to the first through the N-th multipliers 632_1 through 632_N, is 1. The adder 634 adds the respective data multiplied by the weights $k_1$ to $k_n$, and thereby calculates the candidate interpolation pixel f'.

The motion analyzer 640 determines discontinuities between the current block and the peripheral blocks by analyzing the motion vector $v_0$ of the current block and the motion vectors $v_1$ through $v_{N-1}$ of the peripheral blocks.

The final interpolation pixel selector 650 selectively outputs one of the first interpolation pixel $f_0$ and the candidate interpolation pixel f' according to the result from the motion analyzer 640.

The described block-based motion compensation apparatuses 100 and 600, and the method thereof can be widely applied to industry such as a motion picture compression system and frame rate conversion of a high definition television.

As described hereinbefore, according to the block-based motion compensation apparatus, and the method of the same, it is possible to select discontinuous areas between blocks, that is, select the areas where the block artifacts occur, and apply the OBMC only to the selected areas. Accordingly, when the OBMC is selectively applied to the whole block, an image quality deterioration such as blurring can be reduced, and the block artifacts are also prevented or reduced during the motion compensation.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:
1. A block-based motion compensation apparatus comprising:
a first motion compensation interpolator to read a first and a second pixel corresponding to a motion vector of an estimated current block respectively from a current and a previous frame or field inputted, and to calculate a first interpolation pixel;

at least one second motion compensation interpolator to read a third and a fourth pixel corresponding to a motion vector estimated with respect to each of at least one peripheral block adjacent to the current block to be interpolated respectively from the inputted current and previous frame or fields, and to calculate a second interpolation pixel;

a candidate interpolation pixel calculator to calculate a candidate interpolation pixel by allocating a predetermined weight to the first and the second interpolation pixels according to relative locations where the first and the second interpolation pixels are interpolated, among the current blocks to be interpolated;

a motion analyzer to analyze the estimated motion vectors of the current block and the peripheral blocks, and to determine whether the current block and the peripheral blocks are continuous; and a final interpolation pixel selector to select one among the first interpolation pixel and the candidate interpolation pixel as a final interpolation pixel according to the result determined at the motion analyzer by comparing a deviation of the motion vectors of the current and the peripheral blocks, and to output the selected final interpolation pixel.

2. The motion compensation apparatus of claim 1, wherein when the deviation determined by the motion analyzer is equal to or larger than a preset threshold, the motion analyzer outputs a signal to the final interpolation pixel selector indicating to select the candidate interpolation pixel calculated from the candidate interpolation pixel calculator as a final interpolation pixel, and when the deviation is smaller than the preset threshold, the motion analyzer outputs a signal indicating to select the first interpolation pixel calculated from the first motion compensation interpolator as a final interpolation pixel.

3. The motion compensation apparatus of claim 1, wherein the first and the second motion compensation interpolators respectively comprise:

a first pixel reader to read the first pixel corresponding to the motion vector of the current block from the inputted current frame or field;

a second pixel reader to read the second pixel corresponding to the motion vector of the current block from the inputted previous frame or field;

a first and a second multiplier to multiply a relative location correlation coefficient between the current and the previous frame or fields and the frame or field to be interpolated by the read first and second pixels, and to output the result as a first and a second multiplication data; and a first adder to calculate the first interpolation pixel by adding the first and the second multiplication data outputted from the first and the second multipliers, wherein the sum of the relative location correlation coefficients which are respectively provided to the first and the second pixels is 1.

4. The motion compensation apparatus of claim 3, wherein the relative position correlation coefficient is calculated by a following equation:

$$r = \frac{b}{a+b}$$

where, r is the relative location correlation coefficient multiplied by the second pixel, a is a minimum distance between the frame or field to be interpolated and the previous frame or field, and b is a minimum distance between the frame or field to be interpolated and the current frame or field.

5. The motion compensation apparatus of claim 1, wherein the candidate interpolation pixel calculator comprises:

a weight storage part storing weights allocated with respect to the relative locations of the pixels for interpolation in the current block, the weight storage part to read and provide the weight corresponding to positions where the calculated first and second interpolation pixels are interpolated, among the allocated weights;

third and a fourth multiplier being provided with the weights corresponding to locations for interpolation of the first and the second interpolation pixels from the weight storage part, to multiply the weights by the first and the second interpolation pixels, and output as a third and a fourth multiplication data; and a second adder to calculate the candidate interpolation pixel by adding the third and the fourth multiplication data outputted from the third and the fourth multipliers, wherein the sum of the weights allocated to the first and the second interpolation pixels in the location where the first and second interpolation pixels are interpolated is 1.

6. The motion compensation apparatus of claim 5, wherein the weight allocated to the first interpolation pixel decreases, and the weight allocated to the second interpolation pixel increases as the location for the first and the second interpolation pixels shifts from the center toward the border of the interpolated block.

7. The motion compensation apparatus of claim 1, further comprising a delayer to delay the inputted current frame or field for a predetermined time, and to provide the delayed frame or field to the first and the second motion compensation interpolators and the motion compensation part.

8. The motion compensation apparatus of claim 1, wherein the number of the provided second motion compensation interpolator is identical to the number of the peripheral blocks.

9. A block-based method of motion compensation comprising:

reading a first and a second pixel corresponding to a motion vector of an estimated current block, respectively from a current and a previous frame or field, and calculating a first interpolation pixel with a first motion compensation interpolator;

reading a third and a fourth pixel corresponding to motion vectors estimated with respect to each of at least one peripheral block adjacent to the current block to be interpolated, respectively from the inputted current and previous frame or field, and calculating a second interpolation pixel with at least a second motion compensation interpolator;

calculating a candidate interpolation pixel by allocating a predetermined weight to the first and the second interpolation pixels according to relative locations where the first and the second interpolation pixels are interpolated among the current blocks to be interpolated with a candidate interpolation pixel calculator;

analyzing the estimated motion vectors of the current block and the peripheral blocks to determine whether the current block and the peripheral blocks are continuous with a motion analyzer; and selecting among the first interpolation pixel and the candidate interpolation pixel as a final interpolation pixel according to the result determined in the determining operation of the motion analyzer that compares a deviation of the motion vectors of the current and peripheral block, and then outputting the selected final interpolation pixel with a final interpolation pixel selector.

10. The method of claim 9, wherein when the deviation determined by the motion analyzer is equal to or larger than a preset threshold, the motion analyzer outputs a signal to the final interpolation pixel selector indicating to select the candidate interpolation pixel calculated from the candidate interpolation pixel calculator as the final interpolation pixel, and when the deviation is smaller than the preset threshold, the motion analyzer outputs a signal indicating to select the first interpolation pixel calculated from the first motion compensation interpolator as the final interpolation pixel.

11. The method of claim 9, wherein the first and the second interpolation pixel calculating operations respectively comprise:
    reading the first pixel corresponding to the motion vector of the current block from the inputted current frame or field;
    reading the second pixel corresponding to the motion vector of the current block from the inputted previous frame or field;
    multiplying a relative location correlation coefficient between the current and the previous frame or fields and the frame or field to be interpolated by the read first and second pixels, and outputting the result as a first and a second multiplication data; and
    calculating the first interpolation pixel by adding the first and the second multiplication data outputted from the first and the second multipliers,
    wherein the sum of the relative location correlation coefficients which are respectively provided to the first and the second pixels is 1.

12. The method of claim 11, wherein the relative position correlation coefficient is calculated by a following equation:

$$r = \frac{b}{a+b},$$

where, r is the relative location correlation coefficient multiplied by the second pixel, a is a minimum distance between the frame or field to be interpolated and the previous frame or field, and b is a minimum distance between the frame or field to be interpolated and the current frame or field.

13. The method of claim 9, wherein the candidate interpolation pixel calculating operation comprises:
    reading and providing the respective weights corresponding to positions where the calculated first and second interpolation pixels are interpolated, among the weights allocated according to relative locations of the pixels to be interpolated in the current blocks;
    multiplying the weights by the first and the second interpolation pixels, and outputting the result as a third and a fourth multiplication data; and
    calculating the candidate interpolation pixel by adding the outputted third and fourth multiplication data,
    wherein the sum of the weights allocated to the first and the second interpolation pixels in the location where the first and second interpolation pixels are interpolated is 1.

14. The method of claim 13, wherein the weight allocated to the first interpolation pixel decreases and the weight allocated to the second interpolation pixel increases as the location for the first and the second interpolation pixels shifts from the center toward the border of the interpolated block.

15. The method of claim 9, further comprising delaying the inputted current frame or field for a predetermined time and then providing the delayed frame or field to the first and the second interpolation pixel calculating operation.

16. The method of claim 9, wherein the number of the provided second interpolation pixel is identical to the number of the peripheral blocks adjacent to the current block to be interpolated in the second interpolation pixel calculating operation.

17. A block-based method of motion compensation, comprising:
    calculating a candidate interpolation pixel by allocating a predetermined weight to a first interpolation pixel and a second interpolation pixel according to relative locations where the first and the second interpolation pixels are interpolated among the current blocks to be interpolated;
    selecting areas of image blocks where block artifacts occur; and
    applying an overlap block motion compensation only to the selected areas,
    wherein the areas of the image blocks are discontinuous areas between blocks, and
    wherein the selecting of the discontinuous areas includes comparing a deviation between motion vectors of a current block and peripheral blocks; and outputting a final interpolation pixel that is selected from among the first interpolation pixel; and the candidate interpolation pixel according to the compared deviation.

18. The method of claim 17, wherein the overlap block motion compensation comprises:
    reading a first and a second pixel corresponding to a motion vector of an estimated current block, respectively from a current and a previous frame or field, and calculating the first interpolation pixel;
    reading a third and a fourth pixel corresponding to motion vectors estimated with respect to each of at least one peripheral block adjacent to the current block to be interpolated, respectively from the inputted current and previous frame or field, and calculating the second interpolation pixel;
    determining whether the current block and the peripheral blocks are continuous; and
    selecting among the first interpolation pixel and the candidate interpolation pixel as the final interpolation pixel to be used in the overlap block motion compensation according to the result determined in the determining operation, and then outputting the selected final interpolation pixel.

19. The method of claim 17, further comprising selectively applying the overlap block motion compensation to non-selected areas of the image blocks to reduce blurring.

* * * * *